Figure 1:
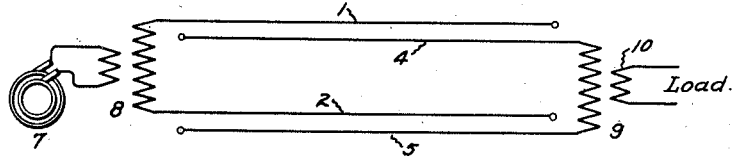

Sept. 29, 1931.   C. A. NICKLE   1,825,624

ELECTRICAL POWER TRANSMISSION

Filed April 18, 1925

Inventor:
Clifford A. Nickle,
by *Alexander S. Lentt*
His Attorney.

Patented Sept. 29, 1931

1,825,624

UNITED STATES PATENT OFFICE

CLIFFORD A. NICKLE, OF SCHENECTADY, NEW YORK, ASSIGNOR TO GENERAL ELECTRIC COMPANY, A CORPORATION OF NEW YORK

ELECTRICAL POWER TRANSMISSION

Application filed April 18, 1925. Serial No. 24,243.

My invention relates to electrical power transmission lines or systems and more particularly to the transmission of electrical power at high voltage over long distances.

As large high voltage power systems have developed and extended, the problem of transmitting the maximum amount of power with stability over long distances is particularly important from an economic standpoint. Theoretical investigations as well as practical installations indicate that there is a limit to the amount of power which can be transmitted over a given line. This limitation has been found particularly troublesome in connection with high voltage long distance transmission lines where economic considerations prohibit the transmission of less than a predetermined amount of power.

It has been noted in particular that the inductive reactance of the long line is a material limitation for the maximum amount of power that can be transmitted with alternating current. High voltage is necessary for long distance transmission and this high voltage requires a considerable spacing of the conductors on the different phases which tends to increase the inductive reactance. The resistance of the line has some influence but the inductive reactance on the long line may be ten times the resistance so that little can be gained by increasing the size of the conductor within practical limits. It has been suggested to use synchronous condensers at various points on the line, to supply reactive power in accordance with the voltage on the line or demand of power, to maintain constant voltage and thus improve regulation, thereby increasing the power limit of a given line. With such means as have been used or suggested, there are still very definite limitations to the maximum power that can be transmitted.

The maximum power P which can be transmitted over a line of reactance $x$ and resistance $r$ may be expressed by the equation:

$$P = \frac{E_1 E_2}{Z} - \frac{E_1^2 r}{Z^2} \quad (1)$$

where $E_1$ = receiver voltage
$E_2$ = supply voltage
$Z = \sqrt{r^2 + x^2}$

For a fixed value of $r$, P is a maximum when $$x = \frac{r}{E_2}\sqrt{4E_1^2 - E_2^2} \quad (2)$$

Thus when $E_1 = E_2$ $$x = \sqrt{3}\, r \quad (3)$$

So that for the condition of equal supply and receiver voltage for a given line, the theoretical relation of reactance and resistance for maximum transmission of power should be such that the reactance is equal to the $\sqrt{3}$ times the resistance.

An object of my invention is to eliminate as far as possible the limitations imposed by the inductive reactance of the transmission line and thereby permit transmission of a maximum amount of power with stability over greater distances than heretofore practicable for a given section or by simple modifications increase the amount of power that can be transmitted over a present installation.

Another object of my invention is to provide means to neutralize the distributed inductive reactance of each line in order to approach the theoretical relation of reactance to the resistance for maximum power transmission.

From a specific standpoint, my invention contemplates a long distance high voltage transmission line in which a portion of the effective inductive reactance of each wire is neutralized so that the ratio of reactance to resistance is more nearly the ratio of $$\sqrt{3} \text{ to } 1.$$

A series capacitance may be interposed in the conductors of the line by employing static condensers or other artificial condensers or by line construction in which each phase conductor consists of two parallel conductors suitably spaced, one conductor being connected to the generator end and the other conductor to the receiving end, so that current will be transmitted from the generating station to the receiving station by means of the parallel conductors and the distributed series capacitance.

The novel features which I believe to be characteristic of my invention are set forth with particularity in the appended claims, the features of construction and operation however, together with further objects and advantages thereof will best be understood by reference to the following description taken in connection with the accompanying drawings.

Figure 2:
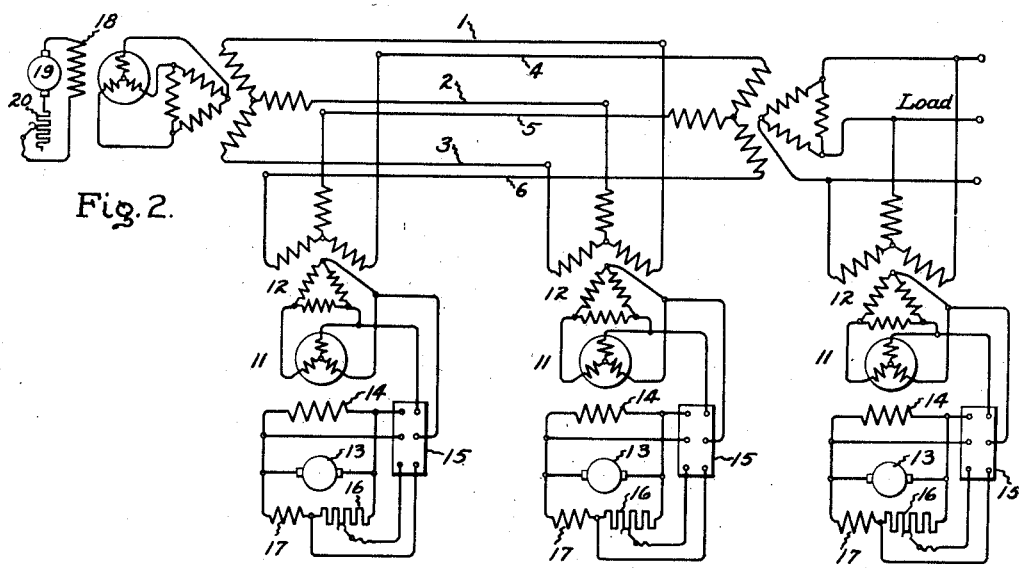
Figure 3:
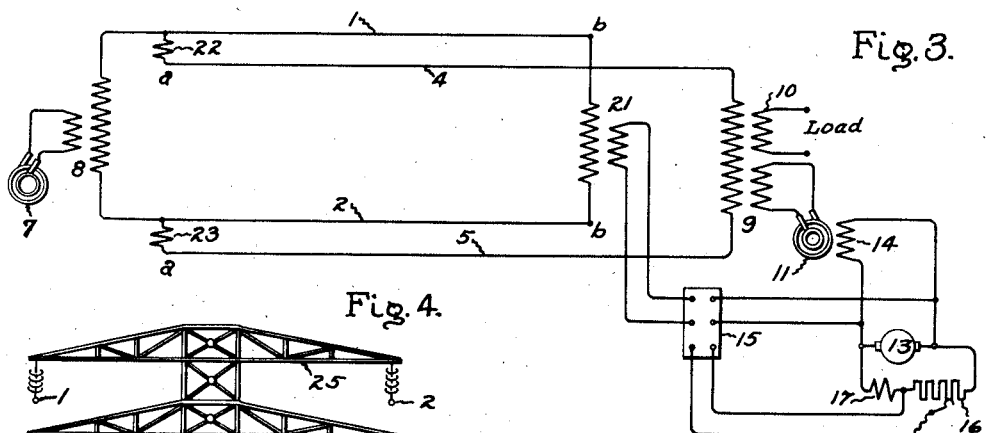
Figure 4:
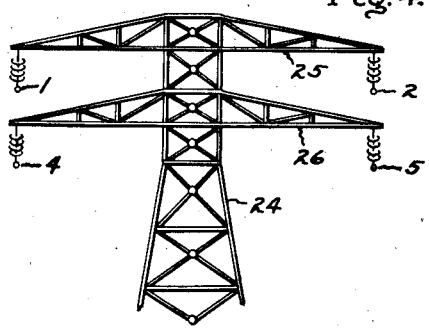

In the drawings Fig. 1 is a simplified diagrammatic illustration of a single phase transmission line in which my invention has been embodied; Fig. 2 is a simplified diagrammatic view of a three phase system with modifications; Fig. 3 is a simplified diagrammatic illustration of a long distance high voltage transmission line with further modifications embodying my invention; and Fig. 4 is illustrative of one arrangement of the conductors for a single phase transmission line.

Referring to Fig. 1, 7 denotes an alternating current generator feeding the primary of a transformer 8. Conductors 1 and 2 are connected to the secondary of transformer 8 and lead toward the receiving end of the line. Conductors 4 and 5 are positioned approximately parallel to conductors 1 and 2 for the whole length of the line, or such portion thereof as may be found desirable, and spaced therefrom at a distance determined by the capacitance requirements. Conductors 4 and 5 are connected to the primary of transformer 9 at the receiving end of the line, while the secondary winding 10 of transformer 9 feeds any desirable load. When voltage is applied to conductors 1 and 2, and a load is connected to conductors 4 and 5 through transformer 9, the supply and receiving ends are thereby connected with the series distributed capacitance interposed in each phase conductor. The capacitance requirements necessary will be determined by the reactance of the line, and the spacing of the conductors of each phase conductor determines the capacitance. It has been found, for example, in the case of a 60 cycle, 500 mile line with a supply voltage of 220,000 volts that a spacing of about five feet will be suitable. By the use of the series capacitance there may be obtained a voltage in the line which partially neutralizes the inductive voltage drop of the line thus causing the generator voltage to lead the receiver voltage by a small angle for a given power transfer. The arrangement of line construction will also have the advantage of low losses since the capacitance assumed will have an air dielectric.

Since maximum power transmission may be obtained when the ratio of reactance to resistance is the $$\sqrt{3 \text{ to } 1,}$$

with equal supply and receiver voltage, it becomes necessary to approach equality of supply and receiver voltage for any given load condition, therefore, to obtain control of the system for any operating condition it will be necessary to use voltage controlling means at suitable points along the line.

It is well known that a synchronous motor may be used at any point in a transmission line to keep the voltage at that point constant. When the line is carrying a large load with a low power factor the motor is over-excited to counteract the inductive reactive component of the line current not neutralized by the inherent characteristics of the line due to line construction.

In Fig. 2 I have shown my invention embodied in a three phase transmission line. Conductors 1, 2 and 3 lead from the supply or generating end toward the receiving end and conductors 4, 5 and 6 paralleling and suitably positioned with respect to the first mentioned conductors lead from the load or receiving end toward the generating end. Synchronous condensers 11 are connected across the load and at suitable points along the line, preferably at the receiving end of conductors 1, 2 and 3, and the generating end of conductors 4, 5 and 6, in order to maintain constant voltage.

Each synchronous regulating station consists of a transformer 12 by means of which synchronous condenser 11 is connected to the transmission line; an exciter 13 energizing the field 14 for the synchronous condenser and a suitable regulator 15 for regulating the synchronous condenser. The regulator may be, for example, a vibratory or Tirrill type voltage regulator responsive to the voltage across one phase of the synchronous condenser and the voltage across the condenser field so as to control the resistor 16 in the exciter field 17, to automatically over-excite or under-excite field winding 14 to control the amount of leading or lagging power supplied to the line and thereby maintain the voltage constant.

The regulator 15 may be first adjusted so that the synchronous machine 11 holds the voltage at the receiving end at the value desired. If necessary the field 18 of generator 7 provided with exciter 19 is then adjusted by resistor 20 so that the voltage impressed upon the generating station transformer is equal or substantially equal to the voltage at the terminals of the synchronous machine 11, at the receiving end of the line. In like manher the regulators of the other synchronous machines along the line may be adjusted as may be found desirable. Now with this relation of approximate equality of voltage between the generator and receiving ends of the transmission line once established, and the receiving voltage automatically held constant, the approximate equality will hold for all loads.

A further modification for regulation and control is shown in Fig. 3, as applied to a single phase system for purposes of illustration and ease of understanding. Here synchronous condenser 11 is connected across the load as in Fig. 2 but with the regulator 15, responsive to the voltage across the terminals of conductors 1 and 2, connected near the receiving end of said conductors by means of transformer 21 to maintain the voltage at $bb$ constant should the load current be at such a value as to cause abnormal voltages regardless of the inherent characteristics of the line. This may be accomplished by changing the power factor of the load current by operating synchronous condenser 11 at over-excitation or under-excitation by means of the regulator 15 depending on the voltage requirements. The voltage at points $aa$ may be held normal by connecting impedance coils 22 and 23 to the supply lines 1 and 2. Synchronous condensers 11 positioned as in Fig. 2 at points along the transmission line may be eliminated when using the condenser across the load regulated in accordance with the voltage at points $bb$ and when using the impedance coils at $aa$.

In Fig. 4 a means of line construction has been shown for a single phase line in which a transmission tower 24 with two supporting arms 25 and 26 is provided for the line wires. Conductors 1 and 2 leading from the supply end are supported by arm 25 with suitable insulators. Conductors 4 and 5 are supported by arm 26 with suitable insulators at an appropriate distance from conductors 1 and 2 and parallel these conductors toward the generating end. The conductors 1 and 2 may parallel conductors 4 and 5 for their entire length or a portion thereof but the termination of these conductors farthest from the generating station will remain open circuited as far as the receiving conductors are concerned.

A considerable increase in the amount of power which can be transmitted with this arrangement, even in excess of such systems as rely on a plurality of synchronous condensers suitably positioned along the line, is due to the fact that I employ a series distributed capacitance for each phase conductor making it possible to approach the relationship in which the reactance of the line is equal to the $\sqrt{3}$ times the resistance. When using synchronous condensers as ordinarily used in parallel with the load, the load current does not flow through both the inductance and the capacity of the circuit. Furthermore, it is impossible to change the capacitance sufficiently by these parallel connected synchronous condensers to approach the desired relation of reactance to resistance for maximum power distribution.

While I have shown and described particular embodiments of my invention as applied to overhead transmission lines, it will be obvious to those skilled in the art that changes and modifications may be made without departing from my invention, and I, therefore, aim in the appended claims to cover all such changes and modifications that fall within the true spirit and scope of my invention.

What I claim as new and desire to secure by Letters Patent of the United States, is:

1. In an electrical power transmission system, a source of alternating current, a receiving circuit, a transmission circuit for interconnecting said source and said receiving circuit, and a distributed capacitance interposed in series relation with said transmission circuit and having a value sufficient substantially to neutralize the inductive reactance of said transmission circuit for increasing the power limit of said system.

2. In a high-voltage power transmission system, a source of alternating current supply, a receiving circuit, and a transmission circuit comprising phase conductors consisting respectively of a plurality of conductors in substantially parallel spaced relation and arranged to provide a series distributed capacitance having a value sufficient substantially to neutralize the inherent inductive reactance of said transmission circuit for increasing the power limit of said transmission system.

3. In an electrical power transmission system, an alternating current generator, a receiving circuit, and a transmission line comprising conductors connected to and leading from said alternating current generator, a second series of conductors connected to and leading from said receiving circuit and arranged in substantially parallel spaced relation to said first mentioned conductors for a portion of their length in a manner to interpose a series distributed capacitance in said transmission circuit having a value sufficient substantially to neutralize the inductive reactance thereof.

4. An electrical power transmission system comprising a supply station and a receiving station, a transmission line comprising a plurality of conductors arranged in substantially parallel spaced relation for each phase conductor extending between said stations, said conductors of each phase conductor being spaced so as to provide a series distributed capacitance for neutralizing the inductive reactance of said transmission line, and regulating means for maintaining equal supply and receiver voltage under variable conditions of load.

5. In a high-voltage electrical power transmission system, an alternating current generator, a receiving circuit, a transmission line comprising conductors connected to and leading from said alternating current generator, a second series of conductors capacitively coupled in substantially parallel spaced relation for a portion of their length with said first conductors and connected to and leading from said receiving circuit, voltage controlling means connected across said first conductors at a point remote from said generator, voltage controlling means connected across said second series of conductors at a point remote from said receiving circuit, voltage controlling means connected across said receiving circuit, said coupled conductors capacitively connecting said generator and said receiving circuit for permitting maximum economical power distribution between said alternating current generator and said receiving circuit.

6. In a high-voltage electrical power transmission system, an alternating current generator, a receiving circuit, a transmission line comprising conductors connected to and leading from said alternating current generator, a second series of conductors capacitively coupled for a portion of their length with said first conductors and connected to and leading from said receiving circuit, synchronous regulating means connected across said first conductors at a point remote from said generator, synchronous regulating means connected across said second series of conductors at a point remote from said receiving circuit, synchronous regulating means connected across said receiving circuit, said coupled conductors capacitively connecting said generator and said receiving circuit for permitting maximum economical power distribution between said alternating current generator and said receiving circuit.

7. In a high-voltage electrical power transmission system, an alternating current generator, a receiving circuit, a transmission line comprising conductors connected to and leading from said alternating current generator, a second series of conductors capacitively coupled for a portion of their length with said first conductors and connected to and leading from said receiving circuit, means for controlling the voltage of said second series of conductors at points remote from said receiving circuit, voltage controlling means connected to said receiving circuit, and means responsive to the voltage across the receiving end of said first conductors for maintaining normal voltage across the receiving end of said first conductors, said coupled conductors capacitively connecting said generator and said receiving circuit for permitting maximum power transmission between said alternating current generator and said receiving circuit.

8. In a high-voltage alternating current transmission system, a transmission line comprising a plurality of conductors for each phase conductor which are arranged in spaced relation over a portion of their length in a manner to interpose a distributed capacitance in series relation with each phase conductor of such a value that the inductive reactance of said line is substantially equal to $$\sqrt{3}$$

times the resistance of said line.

9. In a system of power transmission, a transmission line having an inherent inductive reactance several times in excess of the resistance of said line, and a capacitive reactance interposed in series relation with said line having such a value as to change artificially the ratio of the inductance reactance to the resistance in a manner to approach the theoretical relation of inductive reactance to resistance for permitting a maximum power flow over said line.

10. In combination, a source of alternating current supply, a receiving circuit, a transmission line comprising phase conductors having an inductive reactance several times in excess of the resistance interconnecting said source of supply and said receiving circuit, and means comprising spaced conductive elements interposed in series with each of said phase conductors and mutually spaced to provide a capacitance in series relation between said source of supply and said receiving circuit for neutralizing so much of said inductive reactance as limits the transmission of maximum power between said source and said receiving circuit.

11. In a system of power transmission, a source of power, a power consumption circuit, a transmission line for interconnecting said source of power and said consumption circuit, capacitance units comprising a plurality of conducting plates separated by a nonconducting substance of high dielectric strength connected in series relation with said transmission line and arranged to have a capacity reactance of such a value as to neutralize the inductive reactance of said transmission line so that the total effective inductive reactance between said source of power and said consumption circuit is reduced to a value negligible in its effect on the power limit of the system.

12. In a system of power transmission, synchronous terminal apparatus, a transmission line interconnecting said terminal apparatus, capacitance units comprising static condensers connected in series relation with said line and arranged for producing a reactive voltage drop equal and opposite to the drop in voltage due to the inductive reactance of said transmission line so that the maximum angular displacement between the voltages of said terminal apparatus is substantially independent of the inductive reactance of said transmission line.

In witness whereof, I have hereunto set my hand this 17th day of April, 1925.

CLIFFORD A. NICKLE.